United States Patent
Naverniouk et al.

(10) Patent No.: US 11,502,929 B2
(45) Date of Patent: *Nov. 15, 2022

(54) SYSTEMS AND METHODS OF MONITORING NETWORK DEVICES

(71) Applicant: GOOGLE LLC, Mountain View, CA (US)

(72) Inventors: Igor Naverniouk, Los Altos, CA (US); Andre Knabben, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,285

(22) Filed: Apr. 5, 2021

(65) Prior Publication Data

US 2021/0226878 A1 Jul. 22, 2021

Related U.S. Application Data

(63) Continuation of application No. 16/398,337, filed on Apr. 30, 2019, now Pat. No. 10,992,563.

(51) Int. Cl.
| | |
|---|---|
| *H04L 12/26* | (2006.01) |
| *H04L 29/12* | (2006.01) |
| *H04L 43/10* | (2022.01) |
| *H04L 43/04* | (2022.01) |
| *H04L 43/0811* | (2022.01) |
| *H04L 43/00* | (2022.01) |
| *H04L 43/16* | (2022.01) |
| *H04L 61/3015* | (2022.01) |

(52) U.S. Cl.
CPC ............ *H04L 43/10* (2013.01); *H04L 43/04* (2013.01); *H04L 43/0811* (2013.01); *H04L 43/14* (2013.01); *H04L 43/16* (2013.01); *H04L 61/3015* (2013.01)

(58) Field of Classification Search
CPC ..... H04L 43/10; H04L 43/04; H04L 43/0811; H04L 43/14; H04L 43/16; H04L 61/3015
See application file for complete search history.

(56) References Cited

PUBLICATIONS

Arcanez (snmp-parallel, 2010, https://github.com/arcanez/snmp-parallel, retrieved Dec. 17, 2021). (Year: 2010).*
Hardaker (Thread-Safe patch for Perl SNMP, 2008, https://sourceforge.net/p/net-snmp/patches/907/, retrieved Mar. 30, 2022). (Year: 2008).*
International Preliminary Report on Patentability dated Nov. 11, 2021 for corresponding International Application No. PCT/US2019/064620, 8 pages.

* cited by examiner

*Primary Examiner* — Abdulkader M Alriyashi

(57) ABSTRACT

Implementations of the disclosed subject matter provide systems and methods of assigning, at a server, a unique identifier to each of a plurality of devices communicatively coupled to one another and the server via a communications network. Each unique identifier may be converted to a device hash key by applying a hash function. A range of device hash keys of the plurality of devices may be split into N approximately equal sectors, where N is a prime number and each sector includes 1/N of the device hash keys of the plurality of the devices. K monitoring workers provided by the server may monitor the plurality of devices in an order based on the respective device hash key, where K is an integer.

20 Claims, 3 Drawing Sheets

SYSTEMS AND METHODS OF
MONITORING NETWORK DEVICES

CROSS-REFERENCE TO RELATED
APPLICATIONS

The present application is a continuation application of U.S. patent application Ser. No. 16/398,337, entitled "SYSTEMS AND METHODS OF MONITORING NETWORK DEVICES" and filed on Apr. 30, 2019, the entirety of which is incorporated by reference herein.

BACKGROUND

In present systems, periodic messages are sent from a device to a central location via a communications network, so that the operational status of the device can be determined. The absence of a message being received by the central location for a predetermined period of time from a particular device indicates a problem with that device, or with the communications network. In some systems, polling is used by the central location to periodically request the operational status of each device of the network, and a central record is updated based on the polling results.

BRIEF SUMMARY

According to an implementation of the disclosed subject matter, a method is provided that includes assigning, at a server, a unique identifier to each of a plurality of devices communicatively coupled to one another and the server via a communications network. The method may include converting, at the server, each unique identifier to a device hash key by applying a hash function. At the server, a range of device hash keys of the plurality of devices may be split into N approximately equal sectors, where N is a prime number and each sector includes 1/N of the device hash keys of the plurality of the devices. The method may include providing, at the server, K monitoring workers to monitor the plurality of devices in an order based on the respective device hash key, where K is an integer.

According to an implementation of the disclosed subject matter, a system is provided in that includes a plurality of devices communicatively coupled to one another via a communications network. The system may include a server, communicatively coupled to the communications network, to assign a unique identifier to each of the plurality of devices, convert each unique identifier to a device hash key by applying a hash function, split a range of device hash keys of the plurality of devices into N approximately equal sectors, where N is a prime number and each sector includes 1/N of the device hash keys of the plurality of the devices, and provide K monitoring workers to monitor the plurality of devices in an order based on the respective device hash key, where K is an integer.

According to an implementation of the disclosed subject matter, means for monitoring device of a network are provided, including means for assigning a unique identifier to each of a plurality of devices communicatively coupled to one another and the server via a communications network. Means for converting each unique identifier to a device hash key by applying a hash function may be provided. A range of device hash keys of the plurality of devices may be split into N approximately equal sectors, where N is a prime number and each sector includes 1/N of the device hash keys of the plurality of the devices. K monitoring workers may be provided to monitor the plurality of devices in an order based on the respective device hash key, where K is an integer.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
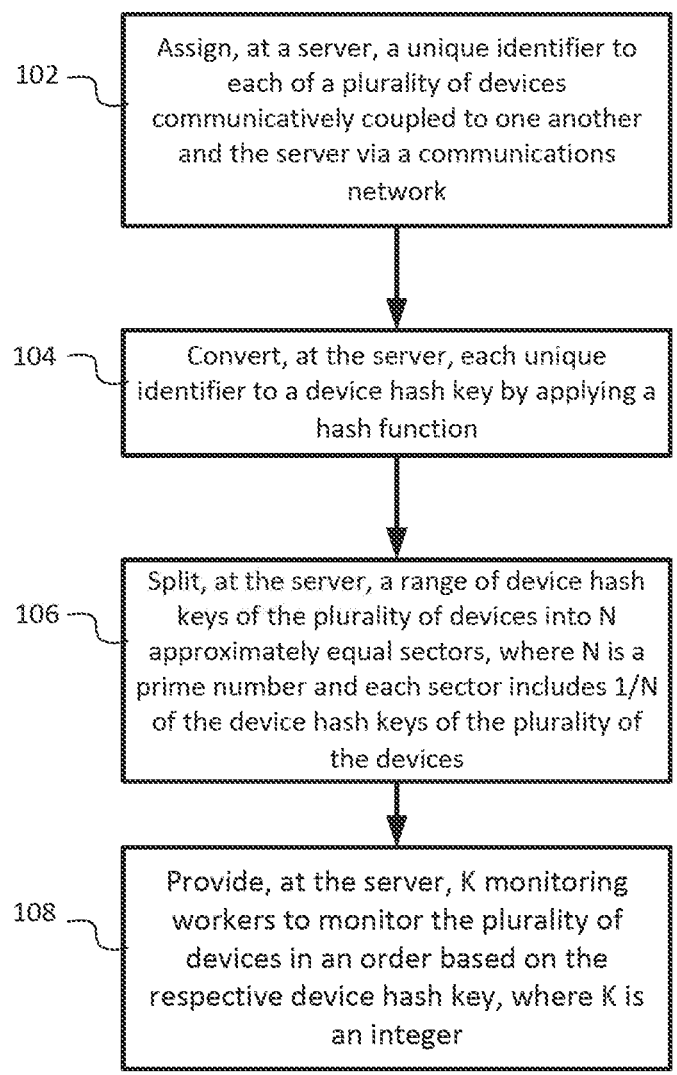
FIGS. 1A-1B show an example method of monitoring devices in a communications network according to an implementation of the disclosed subject matter.

Devices communicatively coupled to a communications network may be unreliable. Depending on the size of the network, there may be hundreds, thousands, or millions of potentially unreliable devices coupled to the network. It may be desirable for one or more computers, such as a server, to have up-to-date information of the status of each device of the network. For example, a device status may include: healthy, available, busy, inaccessible, or the like.

In implementations of the disclosed subject matter, device status information for one or more devices of a network may be collected at a single server location, where device status information collection may be performed by a selected number of workers. Each worker may be software, hardware, or a combination thereof. In some implementations, the workers may be generated (e.g., if the worker includes software) and/or assigned (e.g., if the worker includes a hardware device) by the server. The number of workers allocated to collect device status information may be based on the number of network devices. The number of network devices may change, as new devices are added to the network, or as devices are removed from the network. This arrangement may provide centralized, large-scale device management, without overwhelming the centralized server, and/or any of the individual workers collecting device status.

The centralized server arrangement may determine overall system statistics, and may compare the desired state of each device to its actual state. Devices communicatively coupled to the network may be computers, Internet servers, networking hardware, Internet-of-Things devices or nodes, tablets, laptops, mobile phones, smart watches, and/or smart devices, and/or any other device that may be accessed remotely and probed for its current state. In some implementations, at least some of the devices coupled to the network may be virtual machines (e.g., running untrusted software) on one or more servers.

Implementations of the disclosed subject matter may address the problem of balancing between communicating with each device of the network frequently enough to have a current status of the device, and reducing the amount of communications between devices to reduce the communication traffic and use or network resources. The disclosed arrangements may avoid creating communication bottlenecks in the network, which typically found at a central server in current systems, by distributing the device status gathering tasks.

For example, in some current systems, periodic check-in messages (e.g., "heartbeats") are sent by each device to a central location. Each message contains the current state of a single device. When the central location does not receive a heartbeat from a particular device after a predetermined period of time, the device or the communication medium (e.g., a portion of the communications network) may have a problem. In such current systems, a central location receives these messages, and determines an up-to-date health of the overall system. This approach may handle a certain maximum number of devices (e.g., tens of thousands) or maximum heartbeat frequency (e.g., once per minute per device). However, the central system becomes a bottleneck that has trouble processing the number of heartbeat messages received when, for example, the maximum number of devices or maximum heartbeat frequency is reached or exceeded. Moreover, if the central server is unreliable, such current systems will be prone to outages.

Another approach used in current systems is polling, where the central location (e.g., a central health monitoring service or the like) periodically issues a request for each device of a network for its current state, and updates a central record based on the received state information. This system avoids the problem of having a single node overloaded with incoming messages (i.e., fan-in). The disadvantage of this system is that the central location may be overloaded with sending outgoing messages (i.e., fan-out). That is, the system typically cannot send out enough status check requests from a central location to monitor millions of devices. Another disadvantage of this arrangement is that failure of the central location will disable the entire system (i.e., a single-point-of-failure problem). Thus, the central location must be over-engineered to minimize failure, which may be expensive.

Implementations of the disclosed subject matter may split a data collection into interchangeable parts, which may increase overall system reliability and consistency. The disclosed arrangement may use distributed workers to handle the load of gathering device status information of network devices, which may be stored at the central server. That is, unlike current systems, implementations of the disclosed subject matter do not suffer from excessive fan-in, fan-out, or single-point failure.

Figure 1B:
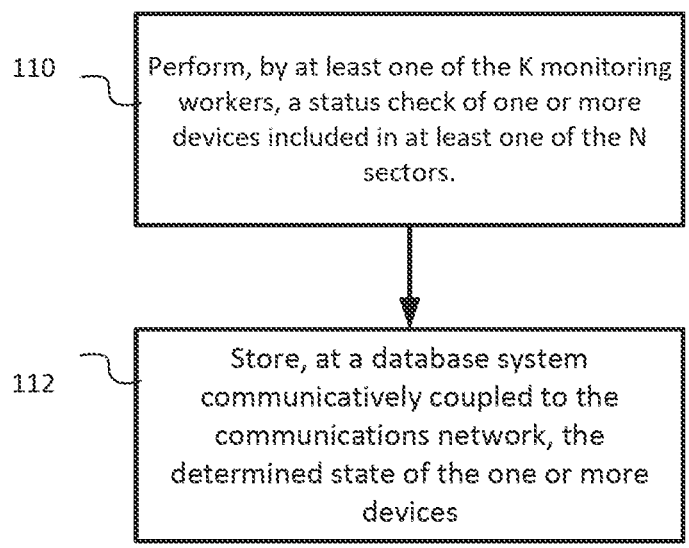

FIGS. 1A-1B show an example method 100 of monitoring devices in a communications network according to an embodiment of the disclosed subject matter. At operation 102, a server (e.g., server 13 and/or remote platform 17 shown in FIG. 3) may assign a unique identifier to each of a plurality of devices (e.g., device 10, 11 shown in FIGS. 2-3) communicatively coupled to one another and the server via a communications network (e.g., network 7 shown in FIG. 3). Each device communicatively coupled to the network may have a globally unique identifier or name, which may be assigned by the server.

Each device that is communicatively coupled to the communications network may be configured to receive queries regarding the operating state of the device. The queries may be received, for example, via networking protocols, such as HTTP (hypertext transfer protocol), TCP/IP (transfer control protocol/internet protocol), and the like. In some implementations, a proxy service may be used to maintain persistent communication channels with each of the devices coupled to the network. The proxy service may use a plurality of workers, which are discussed in detail below, to determine the status of one or more devices of the network. A computer or server, such as server 13 and/or remote platform 17 shown in FIG. 3, may provide the proxy service. In some implementations, the workers may be controlled by the server of the proxy service. This service may determine, for example, that a device is healthy whenever the corresponding communication connection to the device via the network is open (i.e., operational).

At operation 104, each identifier and/or name may be converted by the server (e.g., server 13 and/or remote platform 17 shown in FIG. 3) into an integer called a device hash key by applying a hash function. In some implementations, a hash function such as MD5, SHA-1, or the like may be used. In some implementations, the device hash key may be 64 bits in length, or any other suitable bit length.

At operation 106, the server may split a range of device hash keys of the plurality of devices into N approximately equal sectors (i.e., sub-ranges), where N may be a prime number and each sector includes 1/N of the device hash keys of the plurality of the devices. In some instances, the number of hash keys may not be exactly divisible by N, so some sectors may be one key larger than other sectors. That is, some sectors may have the 1/N fraction of devices rounded down, while other sectors may have the 1/N fraction of devices rounded up. In some implementations, the value of N may be 101, or any other suitable prime number. Selecting a large prime number for N (e.g., 101) may provide that no two workers of the proxy service operated by the server ever read the same sector from a database (e.g., database 15 shown in FIG. 3) at the same time, or write a state update to the database for the same device, as discussed in detail below.

A plurality of K monitoring workers, where K is an integer, maybe deployed, generated, and/or assigned by the server to monitor the plurality of devices communicatively coupled to the network. As shown in FIG. 1A, the server may provide K monitoring workers to monitor the plurality of devices in an order based on the respective device hash key at operation 108. In some implementations, K may have a value of 9, or may have any suitable integer value. Each worker may be software, hardware, or a combination thereof that may be operated continuously.

As shown in FIG. 1B, example method 100 may include performing, by at least one of the K monitoring workers, a status check of one or more devices included in at least one of the N sectors at operation 110. Each worker may monitor the state of each device, one by one, in order of their hash keys. If a device is temporarily inaccessible or communication with the device via the network is below a predetermined data rate, a worker may initiate the state check of the next device before the state check of the current one is completed. A status check of the next device in the one of the N sectors may be initiated before the completion of a status check of a current device of the plurality of devices when it is determined that the current device is inaccessible via the communications network or responding below a predetermined threshold.

That is, a worker may determine the operating state of a plurality of devices. In some implementations, the operating state of a plurality of devices may be determined simultaneously. The system may include a central database (e.g., database 15 shown in FIG. 3) that records the most recently determined operating state of each device.

A database system (e.g., database 15 shown in FIG. 3) may store the determined state of the one or more devices at operation 120. The determined state of each of the plurality of devices may be stored to the database system when the determined state has changed from the previously-stored state. That is, in implementations of the disclosed subject matter, the database of the system may have the most recently verified operating state of each device stored. Workers may not write device status data to the database unless a currently determined operational state of the device has changed from the operating state recorded in the database.

In some implementations, each worker may processes one sector of hash keys at a time. The worker may read data for a sector from the database, and may query the devices in the sector to determine the current operating state of each device. The worker may write any determined operating state changes to the database. Each sector may include approximately 1/N fraction of all devices for the network. The value of N may be selected to restrict the frequency of database reads (i.e., requests received by the database to retrieve data) to a predetermined rate. This rate may be when the database may read and provide the requested data, and not be overwhelmed with requests so as to result in a delay greater than a predetermined amount of time delay.

The frequency of write operations to the database (e.g., requests to write data to the database) may be based on the number of actual state changes of devices coupled to the network. In implementations of the disclosed subject matter, each worker may determine which sector to process at a particular point in time. In an illustrative example, the device hash keys may be 64-bit integers. That is, the integers of the device hash keys may be between 0 and 2 to the power of 64 minus 1, inclusive (i.e., 0 to $2^{64}-1$)

The range of devices having device hash key numbers may be split into N sectors, numbered from 0 to N−1, with the $j^{th}$ sector starting at hash key (2\*\*64)/N\*j+min(j, (2\*\*64)% N) and may include (2\*\*64)/N+(j<(2\*\*64)% N)) hash keys. In this equation, \*\* is the to the power of operator, min(x,y) is the minimum of two integers, the % operator is remainder after division, the/operator is truncating integer division, and the <operator is less than, which evaluates to 0 or 1.

In implementations of the disclosed subject matter, the difference in size between the largest and smallest sectors may be one (1). In some implementations, the desired frequency of determining operation state for each device may be P, which is a measure of time. The system may determine the operation state of each device once per P.

In an example, the K workers may be numbered from 0 to K−1. At any given time t, worker number 0 may process sector number (t % (P\*K))\*N/(P\*K), where operator \* is multiplication. In this example, other workers may operate in a similar manner to worker number 0, except that they may adjust their clocks to be (P\*i) ahead, where i is the worker number (between 0 and K−1, inclusive). This may ensure that workers are evenly distributed across the range of device key hashes. This may provide an even distribution of workload among the workers to determine the operating state of devices of the network, so that workers are not overloaded.

The implementations of the disclosed subject matter provides advantages over present systems that may use heartbeats or centralized polling, as described above. The system of the disclosed subject matter may have increased resilience to failures and/or changes. The workers may be allowed to fail (i.e., unable to check status of devices), pause (i.e., temporarily halt checking the status of a device), and/or restart themselves without creating an adverse impact on the overall system. In the implementations of the disclosed subject matter, a worker failure may merely double the operating state check period for a set of devices, which may be easily mitigated by decreasing the value of P. An increase in the number of monitored devices may be unlikely to overload a single worker because hashing will spread the new workload evenly across all workers. Similarly, a widespread operating state change that may affect a large number of devices may be evenly distributed across all workers.

By selected a large prime number for N (e.g., 101), no two workers may read the same sector from the database at the same time, and/or write an operational state change for a device at the database for the same device.

The system parameters, such as the values for P, K, and/or N, may be changed without causing instability and/or crashing the whole system (i.e., the system may continue to be operational). The system may restart one worker at a time and may allow a temporary inconsistency in system parameters across workers. The workers may not rely on any kind of centralized control or shared state, besides the database. The workers may have synchronized clocks (e.g., not off by more than a few seconds).

Figure 2:
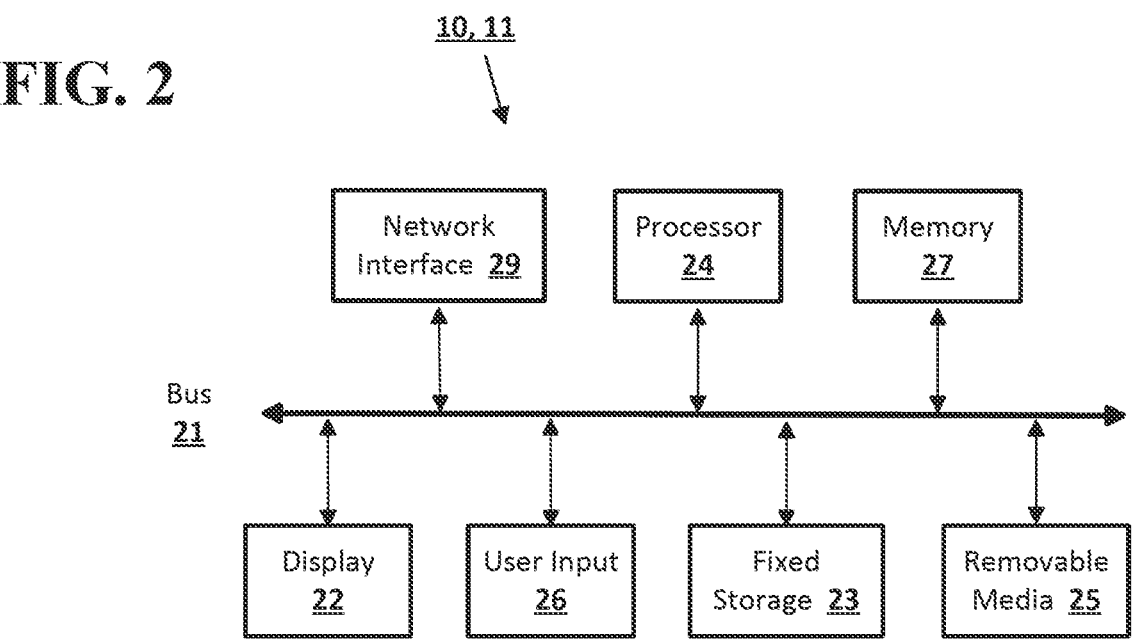
FIG. 2 shows a computing device according to an implementation of the disclosed subject matter.
Figure 3:
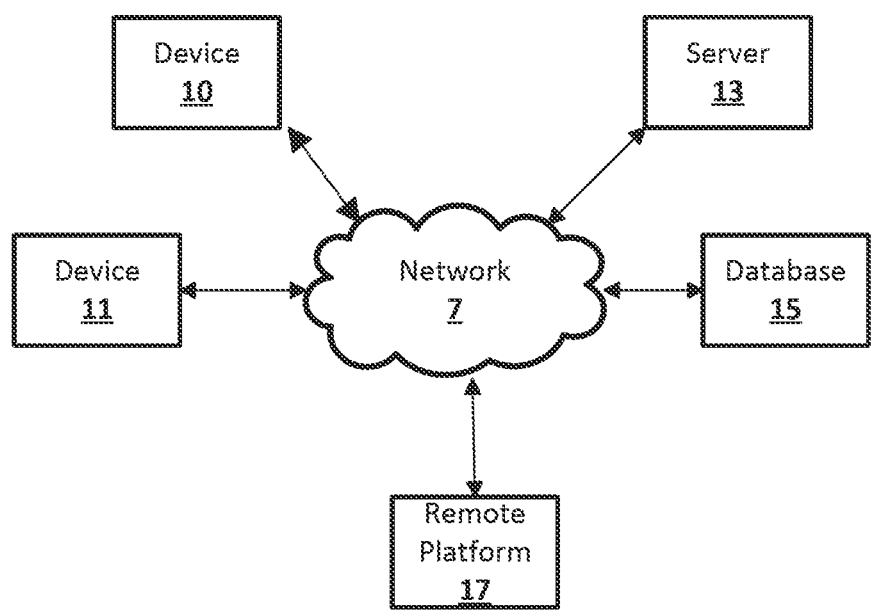
FIG. 3 shows a network configuration according to an implementation of the disclosed subject matter.

In an example, the server (e.g., server 13 and/or database 15 shown in FIG. 3) may generate, assign, and/or allocate workers to monitor the status of gamelets of a cloud-based and/or server-based gaming system (e.g., remote platform 17 shown in FIG. 3). The gamelets may be virtual machines that are executed on a user device (e.g., device 10, 11 shown in FIGS. 2-3) that are communicatively coupled to a network (e.g., network 7 shown in FIG. 3). Games executed within gamelets may make the gamelets unstable, such as by overloading the operational capabilities of a graphics driver, a kernel controlling the gamelet, a communications interface, or the like. Using the method described above in connection with FIGS. 1A-1B, the server and workers may monitor the status of every gamelet being executed by devices of the network. As devices are added or removed from the network, the number of workers may be changed, so that the monitoring activities may be balanced across the workers. When there is a change in status to one or more devices executing the gamelets, the change may be written to a database (e.g., database 15 shown in FIG. 3) that may be accessible and/or controlled by the server to limit the load on the database. This arrangement may provide device management for a game environment without overwhelming the server and/or any of the individual workers collecting device status.

Embodiments of the presently disclosed subject matter may be implemented in and used with a variety of component and network architectures. FIG. 2 is an example computing device 10, 11 suitable for implementing embodiments of the presently disclosed subject matter. The device 10, 11 may be, for example, a desktop or laptop computer, or a mobile computing device such as a smart phone, smart watch, smart device, tablet, or the like, a server, networking hardware, Internet-of-Things devices or nodes, and/or any other device that may be accessed remotely and probed for its current state.

The device 10, 11 may include a bus 21 which interconnects major components of the device 10, 11, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 10, 11 are generally stored on and accessed via a computer readable medium, such as a hard disk drive (e.g., fixed storage 23), an optical drive, floppy disk, or other storage medium.

The fixed storage 23 may be integral with the device 10, 11 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

FIG. 3 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The database 15 may be a MySQL™, PostgreSQL, Oracle™, or Spanner™ database, or the like. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    converting, at a server, a respective unique identifier for each of a plurality of devices to a corresponding device hash key by applying a hash function, the plurality of devices being communicatively coupled to one another and to the server via a communications network;
    splitting, at the server, a range of device hash keys of the plurality of devices into a given number of approximately equal sectors, wherein each sector includes a number of the device hash keys that is proportional to the given number of approximately equal sectors; and providing, at the server, K monitoring workers to monitor the plurality of devices in an order based on the respective device hash key, where K is an integer greater than 1.

2. The method of claim 1, further comprising:

performing, by at least one of the K monitoring workers, a status check of one or more devices included in at least one of the given number of approximately equal sectors.

3. The method of claim 2, further comprising:

initiating a status check of a next device in the one of the given number of approximately equal sectors before completion of a status check of a current device of the plurality of devices when it is determined that the current device is inaccessible via the communications network or responding below a predetermined threshold.

4. The method of claim 2, further comprising:

storing, at a database system communicatively coupled to the communications network, a determined state of the one or more devices in response to determining that the determined state has changed from a previously-stored state.

5. The method of claim 2, further comprising:

determining, using one of the K monitoring workers, which sector of the given number of approximately equal sectors to perform the status check.

6. The method of claim 5, wherein the given number of approximately equal sectors is represented as N and ranges from 0 to N−1, with a $j^{th}$ sector of the given number of approximately equal sectors starting at hash key $(2**64)/N*j+\min(j,(264)\% N)$ and includes $(264)/N+(j<(2**64)\% N))$ hash keys, and wherein the device hash keys are 64-bit integers.

7. The method of claim 6, wherein a difference in size between a largest sector and a smallest sector of the given number of approximately equal sectors is no greater than 1.

8. The method of claim 5, wherein a frequency of the status check performed by one of K monitoring workers for each device of the plurality of devices is P, wherein P is a measure of time.

9. The method of claim 8, wherein the K monitoring workers are numbered from 0 to K−1, the method further comprising:

performing, at any given time t with worker number 0, the status check of devices of sector number $(t \% (P*K))*N/(P*K)$, wherein N represents the given number of approximately equal sectors.

10. The method of claim 9, further comprising:

performing, using workers other than worker number 0, the status check on sector number $(t \% ((P*i)*K))*N/((P*i)*K)$, where i is the worker number between 0 and K−1.

11. A system comprising:

a plurality of devices communicatively coupled to one another via a communications network, wherein at least one device of the plurality of devices is a hardware device; and a server, communicatively coupled to the communications network, to assign a unique identifier to each of the plurality of devices, convert each unique identifier to a device hash key by applying a hash function, split a range of device hash keys of the plurality of devices into a given number of approximately equal sectors, wherein each sector includes a number of the device hash keys that is proportional to the given number of approximately equal sectors, and provide K monitoring workers to monitor the plurality of devices in an order based on the respective device hash key, where K is an integer greater than 1.

12. The system of claim 11, wherein at least one of the K monitoring workers performs a status check of one or more devices included in at least one of the given number of approximately equal sectors.

13. The system of claim 12, further comprising:

initiating a status check of a next device in the one of the given number of approximately equal sectors before completion of a status check of a current device of the plurality of devices when it is determined that the current device is inaccessible via the communications network or responding below a predetermined threshold.

14. The system claim 12, further comprising:

a database system, communicatively coupled to the communications network, to store a determined state of the one or more devices, wherein the determined state of each of the plurality of devices is stored in the database system in response to determining the determined state has changed from a previously-stored state.

15. The system of claim 12, wherein one of the K monitoring workers determines which sector of the given number of approximately equal sectors to perform the status check.

16. The system of claim 15, wherein the given number of approximately equal sectors is represented as N and ranges from 0 to N−1, with a $j^{th}$ sector of the given number of approximately equal sectors starting at hash key $(2**64)/N*j+\min(j,(264)\% N)$ and includes $(264)/N+(j<(2**64)\% N))$ hash keys, and wherein the device hash keys are 64-bit integers.

17. The system of claim 16, wherein a difference in size between a largest sector and a smallest sector of the given number of approximately equal sectors is no greater than 1.

18. The system of claim 16, wherein a frequency of the status check performed by one of K monitoring workers for each device of the plurality of devices is P, wherein P is a measure of time.

19. The system of claim 18, wherein the K monitoring workers are numbered from 0 to K−1, and at any given time t, worker number 0 performs the status check of devices of sector number $(t \% (P*K))*N/(P*K)$, wherein N represents the given number of approximately equal sectors.

20. The system of claim 19, wherein workers other than worker number 0 perform the status check on sector number $(t \% ((P*i)*K))*N/((P*i)*K)$, where i is the worker number between 0 and K−1.

* * * * *